US006990521B1

(12) United States Patent
Ross

(10) Patent No.: US 6,990,521 B1
(45) Date of Patent: *Jan. 24, 2006

(54) TRANSACTION RECOGNITION AND PREDICTION USING REGULAR EXPRESSIONS

(75) Inventor: Perry R. Ross, Englewood, CO (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/264,388

(22) Filed: Oct. 4, 2002

Related U.S. Application Data

(63) Continuation of application No. 09/132,362, filed on Aug. 11, 1998, now Pat. No. 6,477,571.

(51) Int. Cl.
*G06F 15/173* (2006.01)

(52) U.S. Cl. ............. 709/224; 709/203; 709/217; 707/6

(58) Field of Classification Search ........... 709/224, 709/203, 217–219; 707/6
See application file for complete search history.

(56) References Cited

U.S. PATENT DOCUMENTS

| | | | |
|---|---|---|---|
| 4,369,493 A | 1/1983 | Kronenberg | 364/200 |
| 4,802,164 A | 1/1989 | Fukuoka et al. | 395/183.02 |
| 4,835,766 A | 5/1989 | Arutaki et al. | 370/58 |
| 4,894,823 A | 1/1990 | Adelaman et al. | 370/94.2 |
| 4,894,846 A | 1/1990 | Fine | 375/107 |
| 4,905,171 A | 2/1990 | Keil et al. | 364/551.01 |
| 4,930,093 A | 5/1990 | Houser et al. | 364/551.01 |
| 5,045,994 A | 9/1991 | Belfer et al. | 395/183.02 |
| 5,067,107 A | 11/1991 | Wade | 395/500 |
| 5,095,444 A | 3/1992 | Motles | 364/514 |
| 5,101,402 A | 3/1992 | Chiu et al. | 370/17 |
| 5,175,417 A | 12/1992 | Fujishima et al. | 235/380 |
| 5,245,638 A | 9/1993 | Gustafson | 364/550 |
| 5,247,517 A | 9/1993 | Ross et al. | 370/85.5 |
| 5,303,166 A | 4/1994 | Amalfitano et al. | 364/551.01 |
| 5,315,580 A | 5/1994 | Phaal | 370/13 |
| 5,331,574 A | 7/1994 | Temoshenko et al. | 364/551.01 |
| 5,351,243 A | 9/1994 | Kalkunte et al. | 370/92 |
| 5,371,689 A | 12/1994 | Tatsuma | 364/569 |
| 5,379,406 A | 1/1995 | Wade | 395/500 |
| 5,430,709 A | 7/1995 | Galloway | 370/13 |
| 5,461,614 A * | 10/1995 | Lindholm | 370/394 |
| 5,485,610 A * | 1/1996 | Gioielli et al. | 707/102 |
| 5,491,750 A | 2/1996 | Bellare et al. | 380/21 |
| 5,491,792 A | 2/1996 | Grisham et al. | 395/183.15 |

(Continued)

FOREIGN PATENT DOCUMENTS

JP 6214798 8/1994

(Continued)

OTHER PUBLICATIONS

Shim et al., "Specification of Events and States in Complex Systems,", IEEE 1992.

(Continued)

*Primary Examiner*—Philip B. Tran
(74) *Attorney, Agent, or Firm*—Fish & Richardson P.C.

(57) ABSTRACT

The present invention is directed to a method and apparatus for identifying occurrences of transactions, especially in computer networks. A unique identifier, denoted "request identifier", is associated with each service request. Accordingly, for a sequence of service requests detected, a corresponding sequence of request identifiers is generated. The request identifier sequence is compared to regular expressions that correspond to different transactions. If the request identifier sequence matches a regular expression, this sequence is deemed to represent an occurrence of that transaction.

11 Claims, 6 Drawing Sheets

U.S. PATENT DOCUMENTS

| | | | | |
|---|---|---|---|---|
| 5,539,659 A | | 7/1996 | McKee et al. | 364/514 B |
| 5,563,875 A | | 10/1996 | Hefel et al. | 370/15 |
| 5,598,535 A | | 1/1997 | Brech et al. | 395/200.13 |
| 5,619,656 A | | 4/1997 | Graf | 395/200.11 |
| 5,627,886 A | | 5/1997 | Bowman | 379/111 |
| 5,644,717 A | | 7/1997 | Clark | 395/200 |
| 5,668,801 A | | 9/1997 | Grünenfelder | 370/253 |
| 5,684,945 A | | 11/1997 | Chen et al. | 395/182.18 |
| 5,706,429 A | | 1/1998 | Lai et al. | 395/200.01 |
| 5,708,780 A | | 1/1998 | Levergood et al. | 395/200.12 |
| 5,740,355 A | | 4/1998 | Yasuaki et al. | |
| 5,754,768 A | | 5/1998 | Brech et al. | 395/200.6 |
| 5,764,912 A | | 6/1998 | Rosborough | 395/200.54 |
| 5,781,449 A | | 7/1998 | Rosborough | 364/514 R |
| 5,787,253 A | | 7/1998 | McCreery et al. | 395/200.61 |
| 5,802,302 A | | 9/1998 | Waclawsky et al. | 395/200.54 |
| 5,826,270 A | | 10/1998 | Rutkowski et al. | 707/10 |
| 5,838,920 A | | 11/1998 | Rosborough | 395/200.54 |
| 5,881,051 A | | 3/1999 | Arrowood et al. | 370/248 |
| 5,911,048 A | * | 6/1999 | Graf | 709/224 |
| 5,933,602 A | * | 8/1999 | Grover | 709/224 |
| 5,946,302 A | | 8/1999 | Waclawsky et al. | 370/252 |
| 5,978,801 A | * | 11/1999 | Yuasa | 707/6 |
| 6,006,242 A | * | 12/1999 | Poole et al. | 707/531 |
| 6,018,619 A | * | 1/2000 | Allard et al. | 709/224 |
| 6,070,190 A | | 5/2000 | Reps et al. | 709/224 |
| 6,081,774 A | * | 6/2000 | de Hita et al. | 707/3 |
| 6,144,961 A | * | 11/2000 | De La Salle | 709/224 |
| 6,308,211 B1 | | 10/2001 | Rosborough et al. | |
| 6,321,234 B1 | * | 11/2001 | Debrunner | 709/101 |
| 6,477,571 B1 | * | 11/2002 | Ross | 709/224 |

FOREIGN PATENT DOCUMENTS

| | | |
|---|---|---|
| WO | WO 97/06494 | 2/1997 |
| WO | WO 98/44418 | 8/1998 |

OTHER PUBLICATIONS

Lustman, "Specifying Transaction-Based Information Systems with Regular Expressions", IEEE 1994.

U.S. Appl. No. 09/133,069, filed Aug. 12, 1998 entitled "Method and Apparatus for Analyzing Communications on Different Threads" (abandoned), 1998.

Preliminary Amendment for U.S. Appl. No. 09/133,069, 1998.

U.S. Appl. No. 09/186,906 filed Nov. 5, 1998 entitled "Method and Apparatus for Analyzing Communications on Different Threads" (pending).

Preliminary Amendment to U.S. Appl. No. 09/186,906, 1998.

U.S. Appl. No. 09/363,001 filed Jul. 28, 1999 entitled "Network Performance Monitoring" (pending).

Preliminary Amendment to U.S. Appl. No. 09/363,001, 1999.

F. Lustman; "Specifying Transaction-Based Information Systems with Regular Expressions"; IEEE Transactions on Software Engineering, vol. 20, No. 3; Mar. 1994; pp. 207-217.

A. Aho; "Algorithms for Finding Patterns in Strings"; Handbook of Theoretical Computer Science; 1990; Elsevier and MIT Press; pp. 257-300.

Supplementary European Search Report issued in European Appl. No. 99940998 on Jan. 18, 2005.

Copy of Office Action issued in Japanese Appl. No. 2000-565628; Jun. 28, 2005; 6 pages.

* cited by examiner

TRANSACTION RECOGNITION AND PREDICTION USING REGULAR EXPRESSIONS

CROSS REFERENCE TO RELATED APPLICATIONS

This application is a continuation of U.S. application Ser. No. 09/132,362 filed Aug. 11, 1998 now U.S. Pat. No. 6,477,571 by Perry R. Ross and entitled "Transaction Recognition And Prediction Using Regular Expressions".

TECHNICAL FIELD OF THE INVENTION

The present invention is directed generally to a method and apparatus for recognizing and predicting transactions and particularly to a method and apparatus for recognizing and predicting transactions using regular expressions from formal language theory.

BACKGROUND OF THE INVENTION

In computer networks, "information packets" are transmitted between network nodes, wherein an informational packet refers to, e.g., a service request packet from a client node to a server node, a responsive service results packet from the server node to the client node, or a service completion packet indicating termination of a series of related packets. Server nodes perform client-requested operations and forward the results to the requesting client nodes as one or more service results packet(s) containing the requested information followed by a service completion packet. A "service request instance," or merely "service request" refers to a collection of such informational packets (more particularly, service request packets) that are transmitted between two computational components to perform a specified activity or service. Additionally, a group of such service requests issued sequentially by one or more users that collectively result in the performance of a logical unit of work by one or more servers defines a "transaction occurrence". In particular, a transaction occurrence may be characterized as a collection of service requests wherein either each service request is satisfied, or none of the service requests are satisfied. Moreover, the term "transaction" is herein used to describe a template or schema for a particular collection of related transaction occurrences.

It would be desirable to have a computational system to recognize occurrences of transactions and analyze the performance of the transaction occurrences. Accordingly, it is important that such a system be capable not only of recognizing the occurrences of a variety of transactions, but also of associating each such transaction occurrence with its corresponding transaction.

In practice, there are several common variations in the occurrences of a given transaction. These variations are: (a) a service request (or group of service requests) may be omitted from a transaction occurrence; (b) a service request (or group of service requests) may be repeated in a transaction occurrence; and (c) a transaction occurrence may include a service request (or group of service requests) selected from among several possible service requests (or groups of service requests). For example, a transaction occurrence that queries a network server node for retrieving all employees hired last year is likely to be very similar to a transaction occurrence that retrieves all employees that were hired two years ago and participate in the company's retirement plan. These variations are often difficult to account for because, though the number of distinct transactions is typically small, the number of transaction occurrence variations can be virtually unlimited. Accordingly, it is often impractical to manually correlate each variation back to its corresponding transaction.

SUMMARY OF THE INVENTION

An objective of the present invention is to provide a software architecture that is able, based on a sequence of service requests, not only to recognize the occurrences of each of a variety of transactions but also to correlate the occurrences of variations of a given transaction with the transaction itself. A related objective is to provide an architecture that is able to identify occurrences of a transaction, wherein for each such occurrence, a service request (or group of service requests) that is part of the occurrence may have the following variations in a second occurrence of the transaction: (a) a service request (or a group of service requests) may be omitted from a sequence of service request for the second occurrence; (b) a service request (or a group of service requests) may be repeated one or more times in the sequence of service request for the second occurrence; and/or (c) a service request (or a group of service requests) for the second occurrence may be selected from among several possible service requests (or groups of service requests).

In one embodiment of the present invention, a computational system is provided for recognizing occurrences of a transaction, wherein each such occurrence is defined by a sequence of one or more service requests. The method performed in this computational system includes the steps of:
  (a) reading a service request that is transmitted between computational components;
  (b) combining a representation of the service request with a plurality of other service request representations to form a string of service requests representations; and
  (c) comparing the string of service request representations with a formal language regular expression characterizing the transaction to determine if the string corresponds to the transaction.

This methodology not only expresses transactions in a simple and precise format but also, and more importantly, predicts additional transaction occurrences that have not yet been seen. Accordingly, once a transaction is characterized as a regular expression, the characterization can be used to recognize transaction occurrences having various service request sequences, without additional manual intervention. As will be appreciated, a regular expression is a representation of a formal language in which operators describe the occurrence and/or nonoccurrence strings of symbols of the language. Common regular expression operators, for example, are as follows:

| Operator | Description |
| --- | --- |
| * | Event occurs 0 or more times |
| + | Event occurs 1 or more times |
| ? | Event is optional |
| [ ] | Only one of the bracketed symbols occur. |

A formal language corresponding to a regular expression can be used to define a transaction as a language using service request representations as the symbols of the language. That is, service request representations become the "alphabet" of such a regular language, and occurrences of the transaction become string expressions represented in this alphabet. By way of example, the transaction, T, defined by the regular expression A*B+C? D[E F G] specifies that service request A can be present 0 or more times; service request must be present 1 or more times; service request C may be absent or present only once; service request must be present only once; and only one of service requests E, F, and G must be present. Only if all of these conditions are met, in the specified order, will an occurrence of transaction be recognized.

The characterization of a transaction as a regular language can be done either manually, or automatically by a computer. For example, a suitable computational technique can be devised to recognize strings of service request representations denoting the same transaction by:

(a) collecting, over a particular time period, service request instance data transmitted to and from an identified process or computational session;

(b) normalizing the data for each service request instance so that known variations in the service request instances (e.g., different database query values for the same data record field) not pertinent to identifying transaction instances are removed or masked for thereby providing "normalized request instances" that are similar to templates of service request instances.

(c) partitioning the service request instance data into one or more subsets, wherein each subset is expected to be a representation of an instance of a transaction;

(d) determining a regular expression characterization for each partition based on an examination and generalization of repeated service request instance data collections, human understanding of the transactions being performed, the source of the service request instances, and/or the data fields within the service request instances.

Regarding the reading step, mentioned hereinabove, and performed by the computational system of the present invention, this step can include a substep of selecting a category or "bin" to which an individual service request (or group thereof) can be assigned. In particular, such a categorization of a service request many be determined based on at least one of source and a destination process of the service request. For example, in a client-server network, service requests generated by users at client nodes may be assigned to a number of bins, such that each bin includes only those service requests generated by a single user. In particular, each bin includes service requests identified by a collection of related processes, denoted a "thread" in the art, wherein the related processes transmit service requests from, e.g., a single user to a particular server. That is, a "thread" may be considered as a specific identifiable connection or session between a client node and a server or service provider node of a network. Moreover, a thread is preferably identified such that it accommodates only one service request on it at a given point in time. Typically, each thread may be identified by a combination of client (source) and server (destination) nodes. As will be appreciated, in some applications a single network node address (of the source and/or destination) is not an adequate identifier of a thread because there can be multiple sessions or processes executing on a given network node, thereby generating multiple threads. In such cases, connection or session identification information for communicating with a server node can be used in identifying the thread to which the service packet corresponds. Moreover, a thread can be either a client (user) thread, which is a thread that is identifiable using with a specific client computer or user identification, or a shared thread, which is a thread shared among multiple client computers (users).

Still referring to the reading step to determine whether the read service request is part of a string of service requests corresponding to an occurrence of a transaction, the time interval between:

(a) the service request that is nearest in time to the read service request (e.g., the last service request in a sequence of service requests) and;

(b) the read service request is compared against a predetermined time interval. If the time interval is less than the predetermined time interval, the read service request is considered to be a part of a common occurrence of a transaction with the nearest service request. If the time interval is more than the predetermined time interval, the read service request is not considered to be a part of a common transaction occurrence with the nearest service request.

Because a service request may be represented as an extremely long text string and can therefore be inefficient to work with and clumsy to use in matching to a regular expression for a transaction, a unique identifier can be provided for identifying each service request. Note that such an identifier can be a symbol, such as an alphabetical or numerical symbol or sequence thereof.

Further note that the request identifier of a service request is different from the bin in which it is included in that the service request identifiers become the symbols or alphabet of the transaction regular expression according to the present invention.

Another embodiment of the present invention is directed to a system for identifying occurrences of transactions from sequences of service requests using regular expressions. The system includes the following components.

(a) a means for reading a service request that is transmitted between computational components (e.g., on a communications line between a client and a server node of a network, or between two servers);

(b) a means for combining a representation of a service request with a plurality of other service request representations to form a string of service request representations wherein the string may be representative of a transaction; and (c) a means for comparing the string of service request representations with a regular expression characterizing a transaction to determine if the string corresponds to an occurrence of the transaction. As will be appreciated, the reading means, combining means, and comparing means are typically performed on the same processor, or in a number of interlinked processors.

Other features and benefits of the present invention will become evident from the accompanying detailed description and drawings.

DETAILED DESCRIPTION OF THE INVENTION

The Apparatus Configuration

Figure 1:
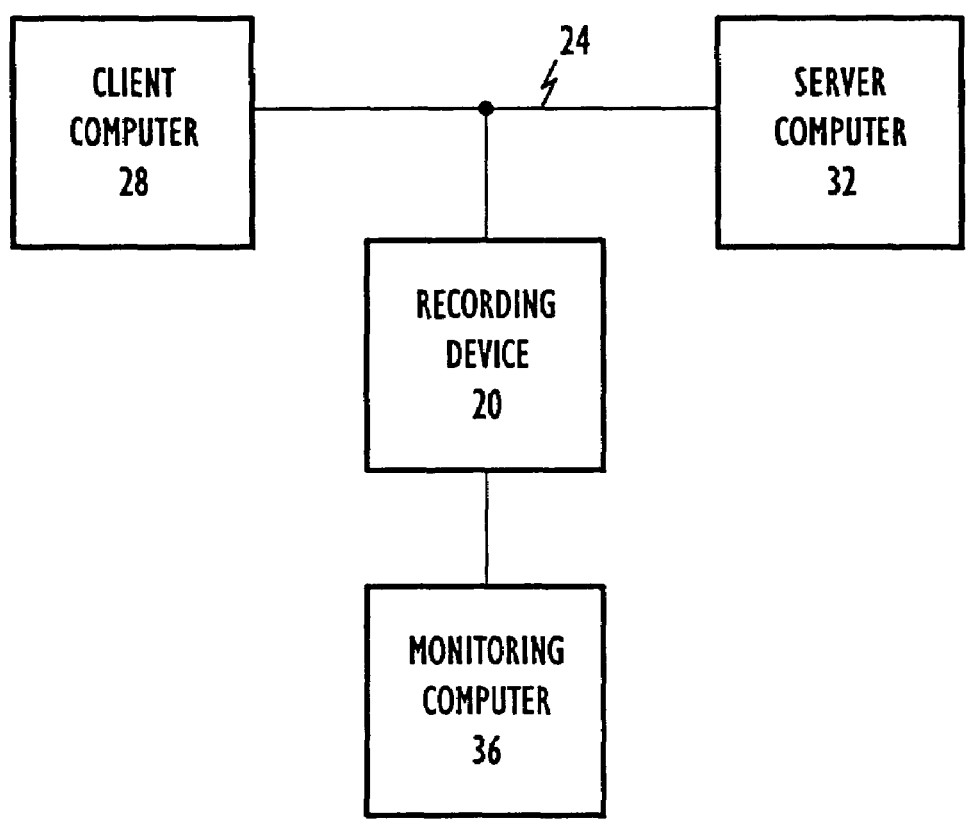
FIG. 1 depicts hardware embodiment of the present invention connected to a computer network.
Figure 2:
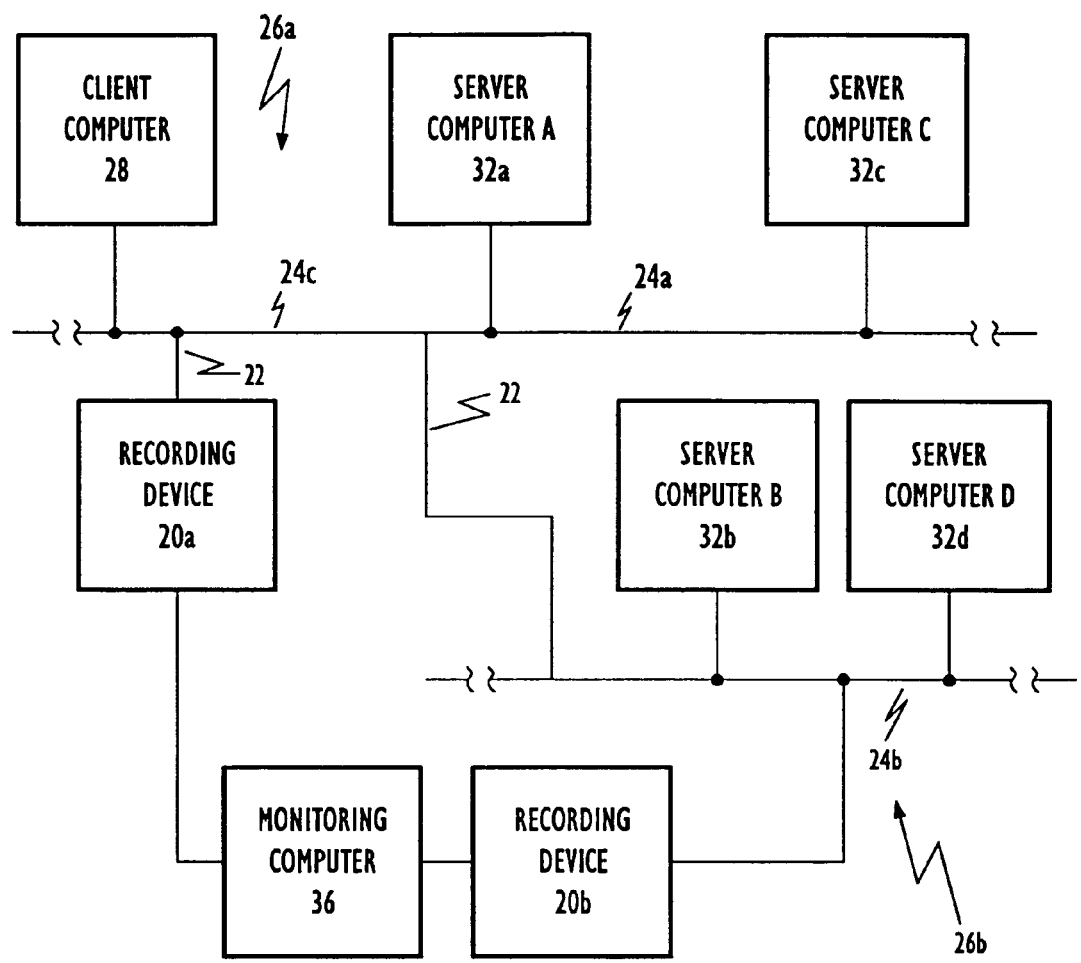
FIG. 2 depicts another hardware embodiment of the present invention connected to a multi-tiered computer network.

An apparatus configuration according to the present invention is depicted in FIGS. 1 and 2 for analyzing the performance of a computer network such as by measuring the response time required for a transaction to be performed. FIG. 1 depicts a simple single network segment wherein the term "segment" denotes a portion of a network having at least two network nodes and the network connections therebetween. In the network of FIG. 1, a recording device or probe 20 is connected to a communication line or busline 24 between a client (or user) computer 28, and a server computer 32 (i.e., a server). The recording device 20 selects one or more informational packets in each service request that is transmitted along the communication line 24 and provides the informational packets and the time at which the packets were received by the recording device 20 to the monitoring computer 36 for analysis. In particular, the informational packets selected provide the received time of the first service request packet (the start time of a service request) and the received time of the final service results or service completion packet (the stop time of a service request). FIG. 2 depicts a more complex multi-tiered architecture with multiple network segments. Recording devices 20a and 20b are connected via a communications devices 22, such as modems, to the communication lines 24a and 24b between the network segments 26a and 26b. In particular, network segment 26a includes client computer 28, server computers 32a, 32c, and the communication lines 24a and 24c, while network segment 26b includes client computer 28, server computers 32b, 32c and communication lines 24b and 24c.

The number and locations of the recording device(s) 20 in a multi-tiered computer network depend upon the application. Typically, a recording device 20 will be connected to a portion of a communication line 24 that is between the interfaces of a client or server computer using the communication line 24 of the segment being monitored. In one embodiment, all of the informational packets communicated on such a communications line 24 will be read by a recording device 20 and an accurate determination of the response time for an occurrence of a transaction or application involving multiple client and/or server computers can be made using the present invention.

Figure 3:
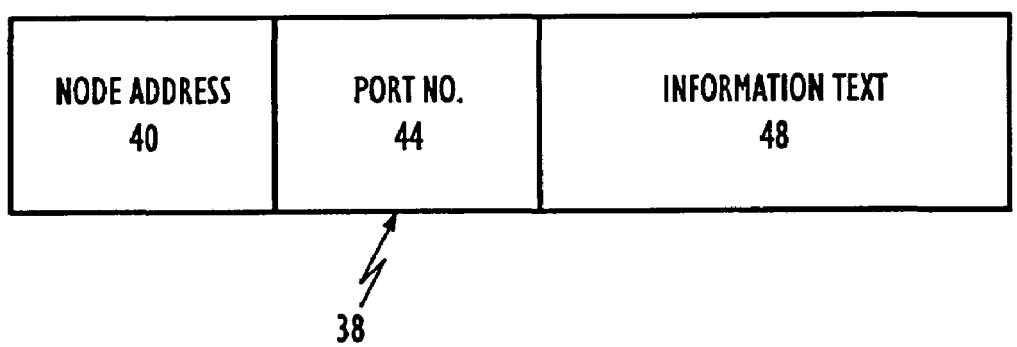
FIG. 3 depicts an informational packet.

A representation of a typical informational packet communicated between computers in a multi-tiered computer network is depicted in FIG. 3. As can be seen from FIG. 3, an informational packet 38 typically includes a node address portion 40, which identifies the source and destination of the informational packet, a port number portion 44 which identifies the source and destination ports, and an additional information portion 48. Depending upon the application, the additional information 48 can be, e.g., a database request, a file system request or an object broker request, as one skilled in the art will understand.

Figure 4:
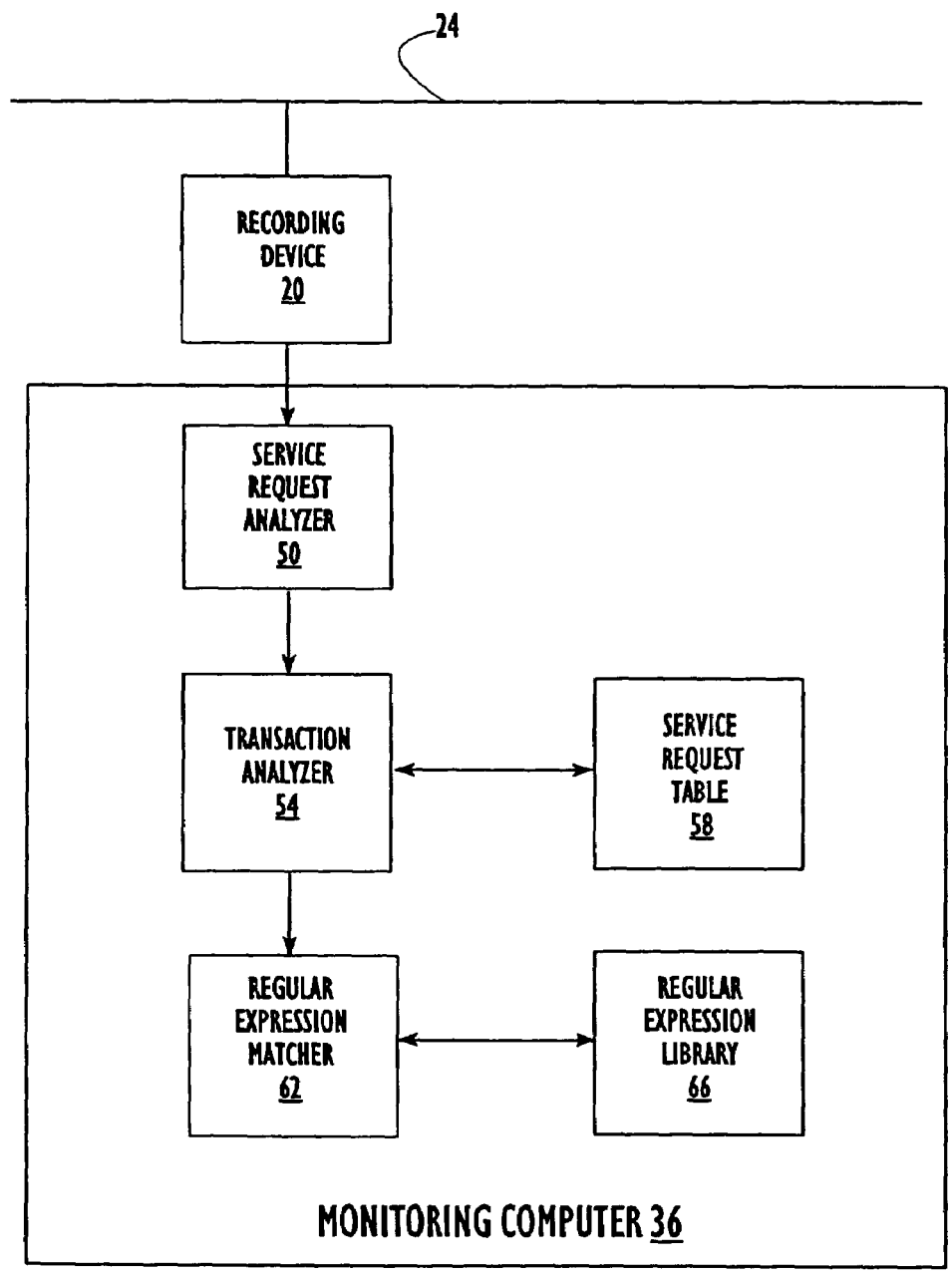
FIG. 4 is a high level block diagram of the data processing components of the present invention.

FIG. 4 is a block diagram of an embodiment of the computational modules for the analysis of service requests according to the present invention. In particular, these modules may be executed on the monitoring computer 36. Accordingly, informational packets 38 detected on a communications line 24 by a recording device 20 is provided to a service request analyzer 50 for identifying individual service requests by determining the informational packets corresponding to each such service request. Note that the service request analyzer 50 generates, for each service request determined, a service request string that identifies the sequence of informational packets therein. Further note that the service request string representations can be extremely long (e.g. up to approximately 8000 characters).

Subsequently, the service request string representations are passed to a transaction analyzer 54 which first matches each service request to a service request identifier in a service request table 58 that is used to store identifications of all service requests encountered thus far during transaction occurrence identifications. That is, the service request table 58 associates with each representation of a service request string a "request identifier", such as an alphanumeric string of one or more characters, wherein this alphanumeric string is substantially shorter than the service request string mentioned hereinabove. In particular, each service request is represented by its request identifier obtained from the service request table 58, thereby providing a more compact and simpler service request representation. Note that matching a service request to its service request identifier is performed using a hashed lookup, binary search, or other well-known in-memory search algorithm.

Following the service request identifier assignments, the transaction analyzer 54 also decomposes the resulting sequence of service request identifiers into collections that are expected to be occurrences of transactions. Subsequently, the collections of service request identifiers assumed to correspond to transaction occurrences are passed to a regular expression matcher 62 for matching with one of a plurality of representations of regular expressions (stored in the regular expression library 66) that have been previously determined to uniquely correspond to transactions.

The Computational Process for Identifying Transactions.

The methodology for reading service requests using the recording device 20, filtering the service requests to form a "communications data set", and subsequently identifying the service requests within the collection of service requests in the communications data set are described in detail in co-pending U.S. application Ser. No. 08/513,435 filed on Aug. 10, 1995, entitled "METHOD AND APPARATUS FOR IDENTIFYING TRANSACTIONS," which is fully incorporated herein by this reference.

Figure 5:
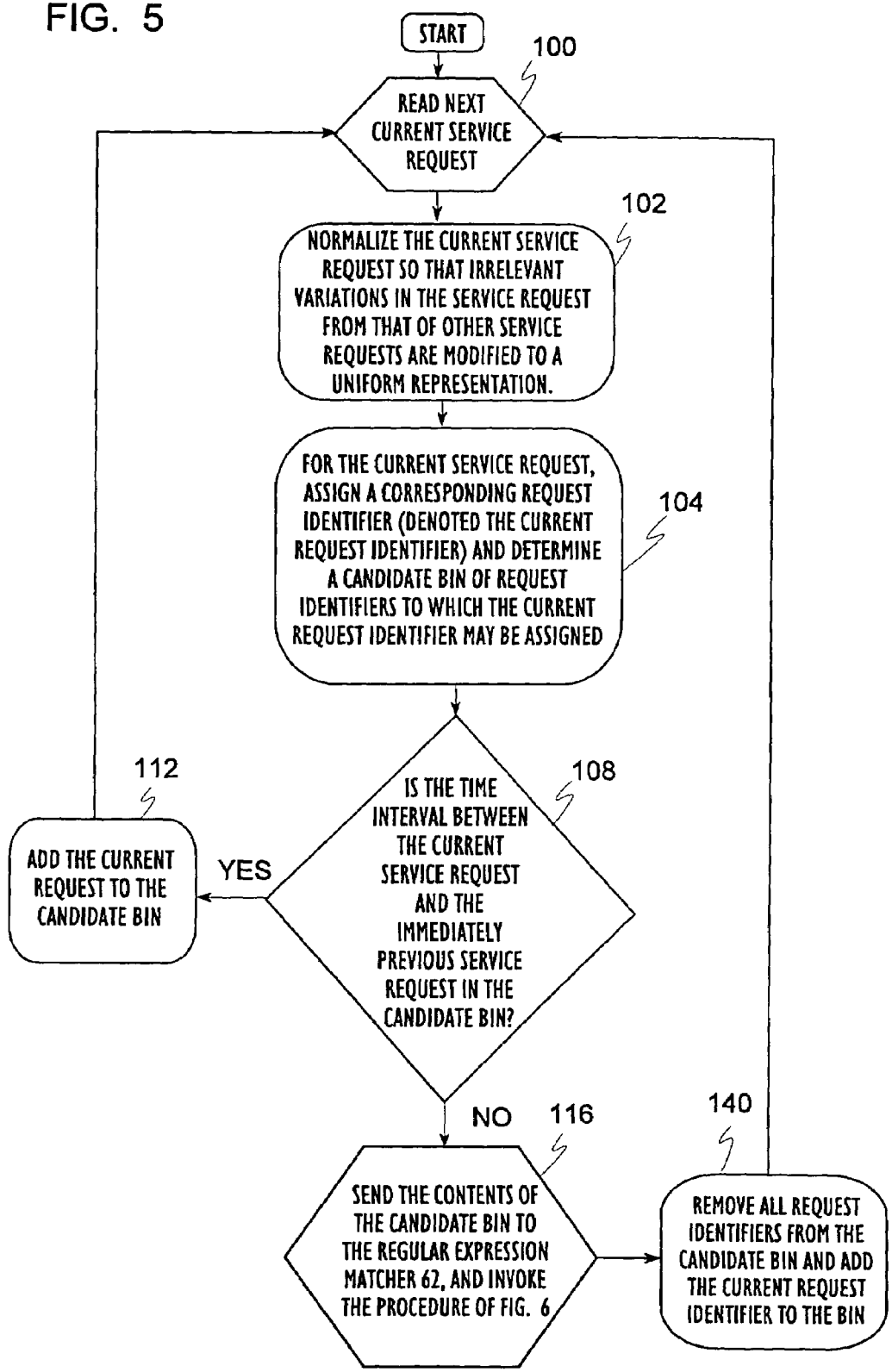
FIGS. 5 and 6 depict an embodiment of a method according to the present invention.
Figure 6:
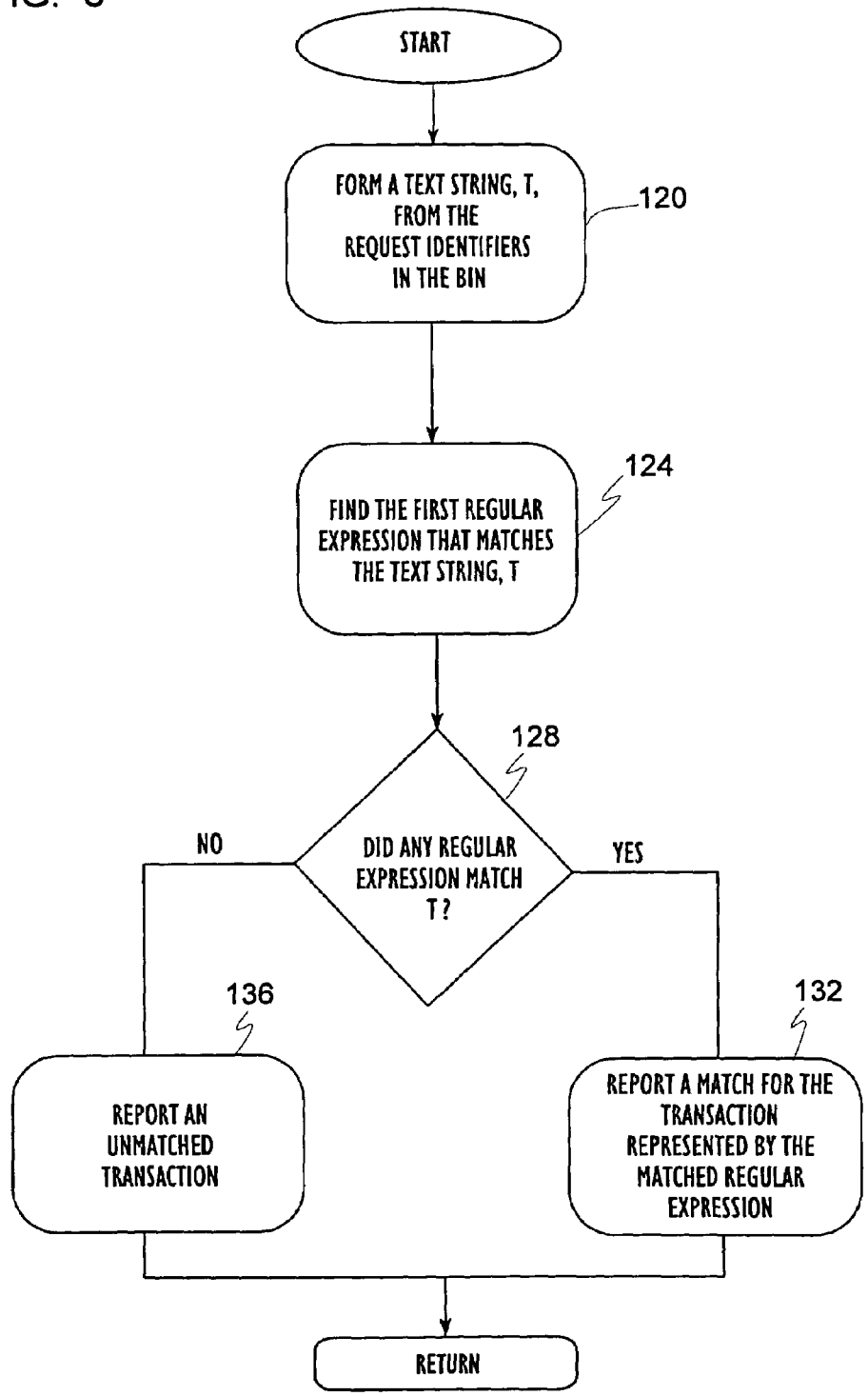

FIGS. 5 and 6 depict the steps of one embodiment of a methodology, according to the present invention, for identifying occurrences of transactions from service request sequences using regular expressions.

Referring to FIG. 5, a main control processing program is illustrated, wherein a service request (denoted the "current service request") is read in step 100 from the service request analyzer 50 by the transaction analyzer 54.

In step 104, the transaction analyzer 54 first replaces each normalized service request string with the more compact representation provided by determining a service request identifier (also denoted the "current request identifier") for the current (normalized) service request from the service request table 58, wherein this identifier is uniquely associated with the service request. Subsequently, in step 104 the candidate "bin" for the current service request identifier is determined, wherein "bin," in the present context, identifies a group of service request identifiers whose service requests are assumed to belong to the same transaction occurrence, by virtue of originating from the same client process. As will be appreciated, the service requests for a plurality of users may be intermixed in the collection of service requests received from the service request analyzer 50. Thus, in step 104, each service request (or request identifier) is sorted by thread identification (e.g., an identification of the data transmission session for transmitting the service request between a client network node and a server network node). Thus, each bin corresponds to a unique thread, and the service request representations therein are ordered by the time their corresponding service requests are detected.

In step 102, a "normalization" of the current service request is performed, wherein service request instance specific information is masked or removed from the current service request. That is, information is masked or removed that would otherwise hinder further processing for identifying a transaction containing the service request. Accordingly, specific values of data fields unnecessary for identifying the service request may be removed. Thus, a data base query having a date specification such as "DATE=01/01/

2000" may be replaced with simply "DATE=*." Furthermore, other irrelevant variations in service requests may also be transformed into a uniform character string. For example, a string of irrelevant blank characters may be replaced with a single blank character. By performing such a normalization, the processing performed by the transaction analyzer 54 in determining a service request identifier (step 104) may be simplified to, for example, substantially a character string pattern matcher.

In step 108 of FIG. 5, the time interval between: (a) the termination of the immediately previous service request (in the candidate bin) to the current service request, and (b) the start time of the current service request is determined. Subsequently, this interval is compared to a predetermined time interval length. The methodology for determining this predetermined time interval length is set forth in the above noted copending U.S. application Ser. No. 08/513,435 filed on Aug. 10, 1995. However, a brief discussion is provided here. That is, each service request is assigned a time based on, for example, the start time and the stop time of the service request as compared to other such times for preceding and/or succeeding service requests. Generally, the monitoring computer 36 identifies a sequence of related service requests by comparing the time interval between the stop time of a first service request and the start time of a succeeding service request against a predetermined length for the time interval. If the time interval is less than or equal to the predetermined length, the service requests are deemed to be part of the same transaction occurrence. Alternatively, if the time interval is more than the predetermined length, the service requests are deemed to be part of different transaction occurrences. Accordingly, the predetermined time interval is selected based on the maximum projected time interval expected between adjacent service requests for two consecutive service requests that are part of the same transaction occurrence.

The determination of the predetermined time interval length is typically an iterative process in which a first time interval length is increased or decreased by a selected time increment and for each modified time interval length, the number of identifiable transaction occurrences is determined. As will be appreciated, a smaller time interval length yields a smaller number of possible transaction patterns than a larger time length. The time interval lengths are plotted against the number of identifiable transaction occurrences for each time interval length and the predetermined time interval length, or "sweet spot", is selected at the midpoint of the region where the curve defined by the plotted points flattens out.

Thus, referring again to the processing of the current service request in step 108 of FIG. 5, if the time interval length between the current service request and an adjacent service request is less than or equal to the predetermined time interval length, the current service request identifier is added to the candidate bin (in step 112) of a previously determined service request representation provided in the candidate bin. Subsequently, the analyzer 54 returns to step 100.

Alternatively, if the time interval is more than the predetermined time interval length, then the service request representation is not added to the service request representations in the candidate bin because the collection of such representations in the bin is deemed to be complete (i.e., is deemed to be representative of a complete transaction occurrence). Instead, in step 116, the transaction analyzer 54 sends the contents of this bin (e.g., as a time ordered sequence of request identifiers, which is also denoted herein as a "request identifier sequence") to the regular expression matcher 62, and subsequently (in step 140) removes the requests from the candidate bin and adds the current request identifier to the bin.

FIG. 6 depicts the operation of the regular expression matcher 62 invoked in step 116 hereinabove. In step 120, the service request identifiers from the bin are concatenated together in time of occurrence order, thereby obtaining, e.g., a text string. This operation forms a compact, yet unique, representation of all of the service requests that comprise a transaction occurrence. By way of example, assume the bin contains representations of the following service requests (in the following time of occurrence order):

(1) LOGIN (i.e., login to a particular database at a server network node)
(2) SELECT (i.e., select one or more data items from the particular database)
(3) INSERT (i.e., insert one or more data items into the particular database)

and the service request string table 58 includes:

| Request Identifier | Service Request |
| --- | --- |
| 1 | INSERT |
| 2 | LOGIN |
| 3 | SELECT. |

Based on the above assumptions, the text string of service requests output in step 120 is: 2 3 1.

Next, in step 124, the regular expression matcher 62 finds the first regular expression that matches the text string output from step 120. This is performed by comparing the text string against every regular expression in the regular expression library 66. In the library 66, each regular expression is represented as a text string that includes request identifiers and regular expression operators, as described in the—summary section hereinabove. Additionally, each regular expression is associated with a corresponding transaction name, such as "ADD USER" or "CHECKOUT BOOK," that denotes the particular transaction associated with the regular expression. In the above example, the text string "2 3 1" matches the following regular expression: 2*3+1?.

In step 128, the regular expression matcher 62 determines whether the text string of service request identifiers matches a regular expression in the regular expression library 66. If a regular expression in the library 66 matches the text string, then in step 132 a match is reported for the transaction name associated with the matched regular expression. Alternatively, if no regular expression in the library 66 matches the text string, then in step 136 a special transaction denoted "UNMATCHED" is reported for the text string. Note that unmatched text strings are logged into an error file to allow regular expressions to be written for them in the future.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the appended claims.

The invention claimed is:

1. A method for recognizing an occurrence of a transaction that is defined by a sequence of one or more service requests, comprising:
   reading a service request that is transmitted between two computational components, the service request comprising at least a portion of a request by a first of the two computational components for processing by a second of the two computational components;

normalizing the service request into a service request representation to remove at least some service request-specific information from the service request;

combining the representation of the service request with a plurality of other service request representations to form a string of service request representations; and automatically comparing the string of service request representations with a predetermined regular expression characterizing the transaction to determine if the string of service request representations corresponds to an occurrence of the transaction.

2. The method of claim 1, wherein the reading step comprises:

selecting a set of service requests from among a plurality of sets of service requests;

categorizing the selected set of service requests based upon at least one of a source and a destination of the service requests in the selected set.

3. The method of claim 1, wherein the service request includes a service request packet.

4. The method of claim 1, wherein each of the service requests in the string of service request representations is ordered by time and further comprising:

comparing a time interval between a second service request and a last service request, for corresponding representations in the string of service request representations, with a predetermined time interval to determine if the representation of the second service request is a part of the string of service request representations.

5. The method of claim 1, further comprising:

assigning to the service request a unique identifier characterizing the service request, wherein said identifier is included in the representation for the service request.

6. The method of claim 1, wherein each of the service request representations in the string has a unique identifier.

7. The method of claim 1, wherein the regular expression includes one or more of the following operators:

(a) an operator indicating that a service request occurs zero or more times;

(b) an operator indicating that a service request occurs one or more times;

(c) an operator indicating that a service request is optional; and (d) an operator indicating that only one of a collection of one or more service requests can occur.

8. A system for recognizing an occurrence of a transaction that is defined by a sequence of one or more service requests, comprising:

means for reading a service request that is transmitted between two computational components, the service request comprising at least a portion of a request by a first of the two computational components for processing by a second of the two computational components;

means for normalizing the service request into a service request representation to remove at least some service request-specific information from the service request;

means for combining the representation of the service request with a plurality of other service request representations to form a string of service request representations; and means for comparing the string of service request representations with a predetermined regular expression characterizing a transaction to determine if the string of service request representations corresponds to an occurrence of the transaction.

9. A method for predicting occurrences of transactions, comprising:

collecting a sequence of service request representations, each service request representation comprising a normalized service request to remove at least some service request-specific information from the service request and each service request comprising at least a portion of a request by a first computational component for processing by a second computational component;

partitioning the service request representations of the sequence into subsets, wherein each subset of service request representations is expected to be indicative of one or more occurrences of a single transaction type;

constructing a regular expression from the one or more occurrences, wherein each of the occurrences satisfy the regular expression; and predicting whether an additional set of service requests is an instance of the transaction type by determining if the additional set of service request representations satisfy the regular expression.

10. A system for recognizing an occurrence of a transaction, comprising:

at least one recorder operable to monitor communication between two network components; and a monitor coupled to the at least one recorder and operable to:

identify a service request that is transmitted between the two network components, the service request comprising at least a portion of a request by a first of the two network components for processing by a second of the two network components;

normalize the service request into a service request representation to remove at least some service request-specific information from the service request;

combine the representation of the service request with at least one other service request representation to form a string of service request representations; and compare the string of service request representations with a predetermined regular expression characterizing a transaction to determine if the string of service request representations corresponds to an occurrence of the transaction.

11. A system for recognizing an occurrence of a transaction that is defined by a sequence of one or more service requests, comprising:

at least one computer readable medium; and software encoded on the at least one computer readable medium and operable when executed by one or more processors to:

read a service request that is transmitted between two computational components, the service request comprising at least a portion of a request by a first of the two computational components for processing by a second of the two computational components;

normalize the service request into a service request representation to remove at least some service request-specific information from the service request;

combine the representation of the service request with a plurality of other service request representations to form a string of service request representations; and compare the string of service request representations with a predetermined regular expression characterizing the transaction to determine if the string of service request representations corresponds to an occurrence of the transaction.

* * * * *